(12) United States Patent
Oommen

(10) Patent No.: US 6,993,328 B1
(45) Date of Patent: Jan. 31, 2006

(54) METHOD FOR OVER THE AIR MOBILE STATION MANAGEMENT

(75) Inventor: Paul P. Oommen, Irving, TX (US)

(73) Assignee: Nokia Corporation (FI)

( * ) Notice: Subject to any disclaimer, the term of this patent is extended or adjusted under 35 U.S.C. 154(b) by 0 days.

(21) Appl. No.: 09/566,376

(22) Filed: May 8, 2000

(51) Int. Cl.
 *H04M 3/00* (2006.01)

(52) U.S. Cl. ............... 455/419; 455/420; 455/414.1; 455/517

(58) Field of Classification Search .......... 455/414.1, 455/414.3, 414.4, 419, 420, 422.1, 517, 550, 455/450, 452.1, 557, 556.2, 566, 90.1, 418, 455/422, 414, 452
See application file for complete search history.

(56) References Cited

U.S. PATENT DOCUMENTS

| | | | |
|---|---|---|---|
| 5,754,953 A | * 5/1998 | Briancon | 455/418 |
| 5,867,781 A | * 2/1999 | Hofmann | 455/419 |
| 5,887,254 A | * 3/1999 | Halonen | 455/419 |
| 5,913,037 A | * 6/1999 | Spofford et al. | 709/226 |
| 5,974,509 A | 10/1999 | Berliner | |
| 6,023,620 A | * 2/2000 | Hansson | 455/419 |
| 6,026,366 A | 2/2000 | Grube | |
| 6,052,600 A | * 4/2000 | Fette et al. | 455/509 |
| 6,108,534 A | * 8/2000 | Bourgeois et al. | 455/419 |
| 6,122,523 A | * 9/2000 | Zicker | 455/551 |
| 6,144,849 A | * 11/2000 | Nodoushani et al. | 455/419 |
| 6,178,443 B1 | * 1/2001 | Lin et al. | 709/208 |
| 6,226,739 B1 | 5/2001 | Eagle | |
| 6,256,493 B1 | * 7/2001 | Dorenbosch et al. | 455/419 |
| 6,308,061 B1 | * 10/2001 | Criss et al. | 455/418 |
| 6,393,496 B1 | * 5/2002 | Schwaderer et al. | 709/328 |
| 6,411,804 B1 | * 6/2002 | Isomichi et al. | 455/412 |
| 6,449,476 B1 | * 9/2002 | Hutchison et al. | 455/418 |
| 6,622,017 B1 | * 9/2003 | Hoffman | 455/419 |

FOREIGN PATENT DOCUMENTS

| | | |
|---|---|---|
| CA | 2267549 | 9/2000 |
| EP | 0459344 A1 | 12/1991 |
| EP | 0991290 A2 | 4/2000 |
| EP | 1035741 A2 | 9/2000 |
| JP | 11331911 | 11/1999 |
| WO | WO 9838820 A2 | 9/1998 |
| WO | PCT WO 00/58838 | 10/2000 |

OTHER PUBLICATIONS

International Conference on Personal Wireless Commuinications 2000 IEEE, Dec. 17–20, 2000, pp. 404–407, sections 1&2, abstract, "A Push DowNload Architecture for Software Defined Radios".

* cited by examiner

*Primary Examiner*—Nay Maung
*Assistant Examiner*—John J. Lee
(74) *Attorney, Agent, or Firm*—Banner & Witcoff, Ltd.

(57) ABSTRACT

The invention provides a system and method for managing a mobile station wirelessly. The control software includes a dynamic agent operating program and a group of objects linked to the dynamic agent operating program. Some of the objects allow the mobile station to utilize services, such as accessing the Internet or E-mail services. Additional objects for providing access to new services may be wirelessly transmitted from a management server to the mobile station over the air and stored in the mobile station. Users may selectively delete and download objects to customize the services available through their mobile stations while minimizing the memory requirements of the mobile station.

3 Claims, 3 Drawing Sheets

METHOD FOR OVER THE AIR MOBILE STATION MANAGEMENT

BACKGROUND OF THE INVENTION

1. Technical Field

This invention relates generally to the management of mobile stations. More particularly, the invention provides a method and system for remotely managing and programming a mobile station over the air.

2. Related Information

Consumers are increasingly using mobile stations, such as cellular telephones and handheld computing devices. In addition to the traditional function of transmitting telephone calls, mobile stations have been used for additional functions, such as accessing the Internet, storing scheduling information and storing telephone numbers. Service providers are constantly increasing the number of services available to consumers through mobile stations.

FIG. 1 shows a conventional monolithic operating program 100 for a conventional mobile station. Conventional operating programs include modules for controlling the operation of the mobile station and providing services to users. For example, operating program 100 includes a volume control module 102 for controlling the volume of the mobile station speaker (not shown) and an e-mail service module 104 for allowing the user to send and receive e-mail messages. Operating program 100 also includes scheduling program module 106 for storing scheduling information. Conventional operating programs may include a variety of additional modules.

When a service provider offers a new service to consumers, it is often necessary to update the software in the mobile station for the consumer to utilize the new service. In particular, it is often necessary to replace the existing operating program with a new operating program that includes a module allowing the user to utilizing the new service. As the number of available services increases, so does the size of the operating program.

In some cases, consumers have been required to bring their cellular telephones to services centers to have new software installed. Consumers are less likely to use new services when they are required to go through burdensome steps to use the new service. An alternative method that involves transmitting an entire new processing program over the air is described in U.S. Pat. No. 5,887,254 to Halon.

Conventional operating programs also do not include diagnostic modules for diagnosing malfunctions. In many instances consumers are required to bring their mobile stations to service centers when their mobile stations malfunction. Service centers perform diagnostic tests on the mobile station and correct the identified problem. The diagnostic process may involve executing one or more diagnostic software modules using the processor of the cellular telephone. Furthermore, the process of correcting the program may involve changes to the software installed on the telephone.

Therefore, there exists a need for a system and method that allows consumers to conveniently receive updates to the software installed on their mobile stations and to have malfunctions diagnosed while minimizing the memory requirements of the mobile stations and the drain on cellular telephone networks.

SUMMARY OF THE INVENTION

The present invention overcomes the aforementioned problems by providing a method and system for modifying control software installed in a mobile station. In one embodiment of the invention, a method of modifying control software installed on a mobile station is provided. The control software includes a dynamic agent operating program linked to a group of objects. The method includes the steps of wirelessly transmitting a new object from a management server to a mobile station over the air; receiving the new object at the mobile station; and storing the new object in a memory of the mobile station.

In another embodiment of the invention, a mobile station that allows a user to communicate in a wireless manner is provided. The mobile station includes a controller that manages the operation of the mobile station. A control program that includes a group of current objects stored in an object memory and dynamic agent operating program stored in a program memory are also provided. The dynamic agent operating program uses the group of current objects to control the operation of the mobile station. Furthermore, the controller and the dynamic agent operating program are configured to allow the mobile station to receive additional objects broadcast in a wireless manner and to store the additional objects in the object memory.

In accordance with, another embodiment of the invention, a system for reconfiguring control software stored in a mobile station is provided. The control software includes a dynamic agent operating program linked to a group of objects. The system includes a mobile station configured to receive and store new objects and a management server configured to wirelessly transmit the new objects to the mobile station.

In accordance with yet another embodiment of the invention a management server that transmits data to reconfigure control software stored in a mobile station is provided. The control software includes a dynamic agent operating program linked to a group of objects. The management server includes a memory containing new objects and a transmitter that transmits the new objects to a mobile station.

The invention, described in detail below, allows users to selectively delete and download objects to customize the services available through their mobile stations while minimizing the memory requirements of the mobile station. Other features and advantages of the invention will become apparent with reference to the following detailed description and the figures.

DETAILED DESCRIPTION OF THE PREFERRED EMBODIMENTS

Figure 2:
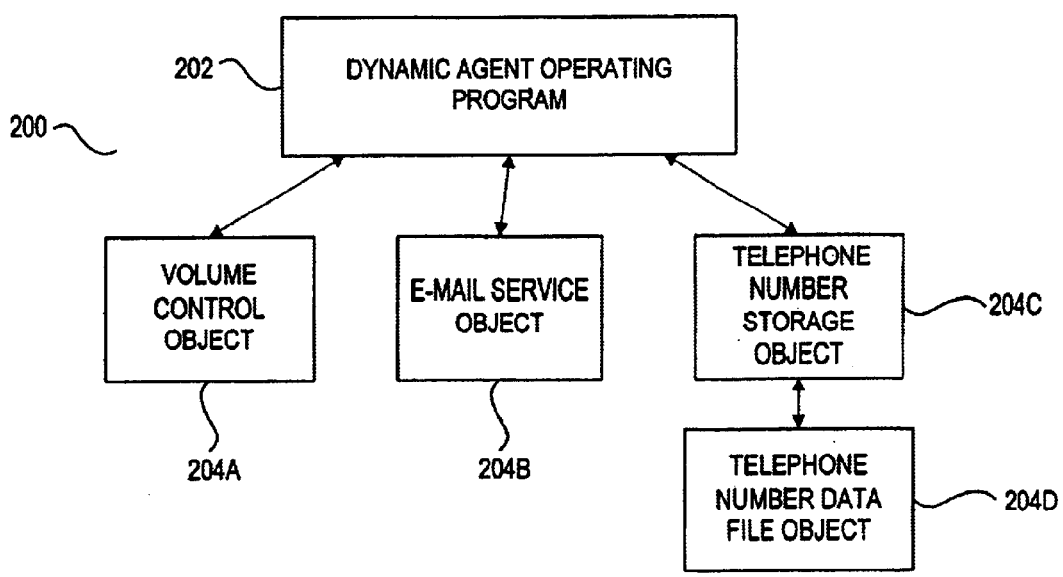
FIG. 2 shows a control program that includes a dynamic agent operating program and objects in accordance with a preferred embodiment of the invention.

FIG. 2 shows a control program 200 that includes a dynamic agent operating program 202 and objects 204A–204D for controlling the operation of a mobile station. Dynamic agent operating program 202 includes software necessary to interact with a controller (shown in FIG.

3) and objects 204A–204D. Objects 204A–204D perform specific functions available to users of a mobile station and may be any number or combination of scripts, instances of classes, software modules or data files. For example, volume control object 204A is used to control the volume of a speaker (not shown). E-mail service object 204B contains software that allows the user to send and receive e-mail messages. Telephone storage object 204C contains software that allows the user to store and retrieve telephone numbers, while telephone number data file object 204D is a data file containing telephone numbers. Objects 204A–204D are shown for illustration purposes only and with the understanding that any variety of additional objects may be part of control program 200. Furthermore, objects may be linked to dynamic agent operating program 202 or other objects.

Figure 1:
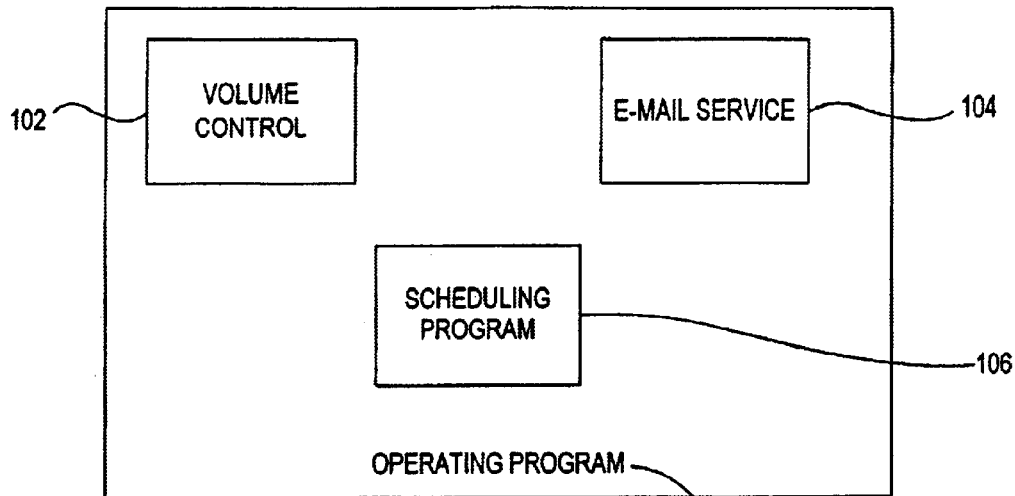
FIG. 1 shows a conventional monolithic operating program used by conventional mobile stations.

Control program 200 is significantly different from conventional operating program 100 shown in FIG. 1. In particular, conventional operating program 100 is a monolithic program while control program 200 is a dynamic agent operating program 202 linked to a group of objects. One of the advantages of a non-monolithic control program is that it facilitates over the air updating of services offered to users. Instead of replacing the entire operating program when a new service is being offered, only a portion of control program 200 is required to be changed which makes it more practical and convenient to make such changes via a wireless network. In an illustrative example, a user may update the software used to send and receive E-mail messages by downloading a new E-mail service object to replace E-mail service object 204B. Furthermore, a user may configure mobile station 302 to access the Internet by downloading an Internet access object and a new dynamic agent operating program that includes a link to the new object.

Figure 3:
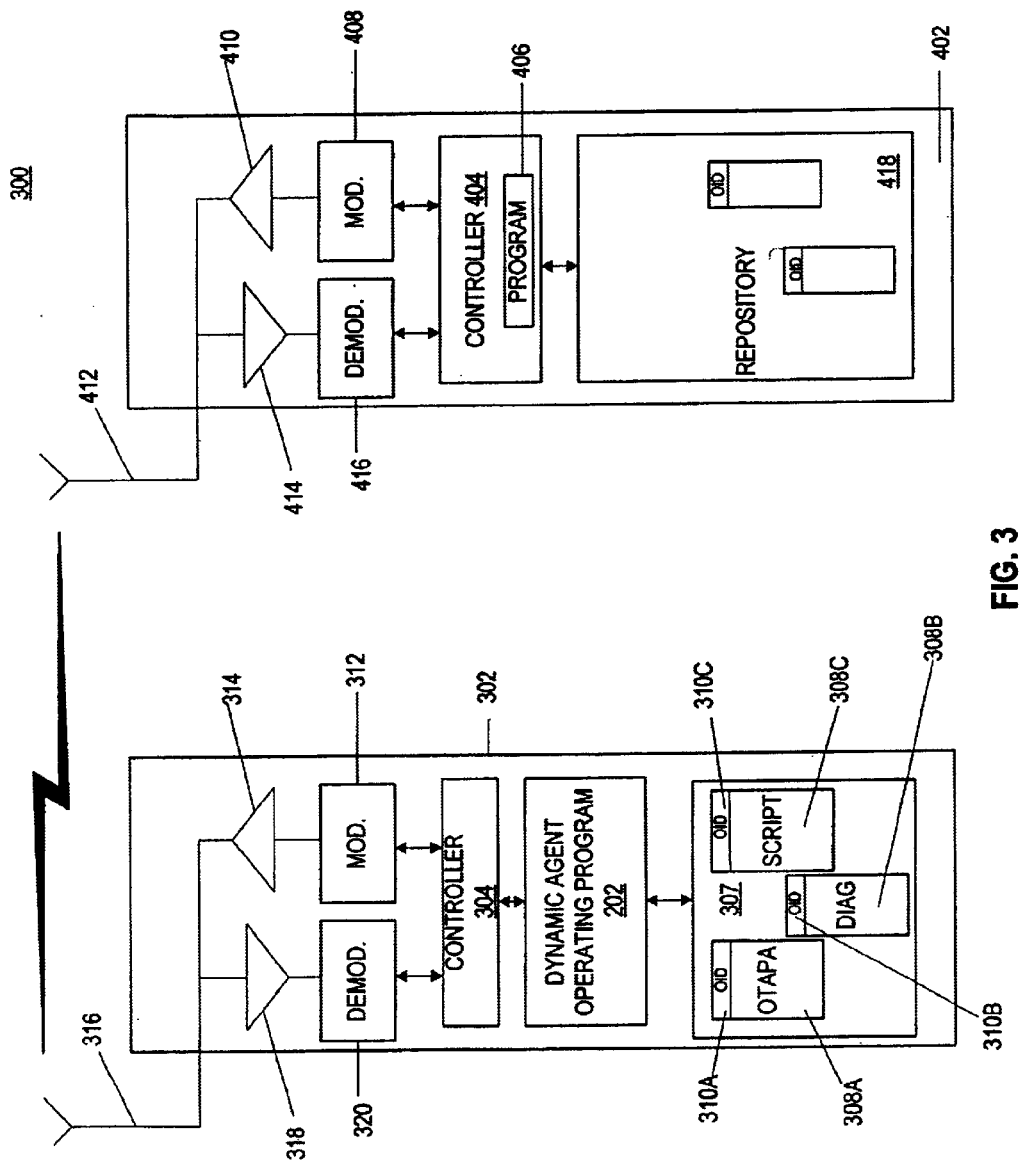
FIG. 3 shows system for over the air management of a mobile station in accordance with a preferred embodiment of the invention.

FIG. 3 shows a system 300 for remotely managing and programming a mobile station 302. It is understood that only portions of mobile station 302 used for management and programming operations are illustrated and additional conventional components such as a speaker, a microphone and a display may also be included.

Dynamic agent operating program 202 is connected to a controller 304. The dynamic agent operating program 202 may be stored in a random access memory or a read only memory. Objects 308A–308C are used in conjunction with the dynamic agent operating program 202 to control the operation of controller 304 and the overall operation of mobile station in the manner described above. Objects 308A–308C are similar to objects 204A–204D shown in FIG. 2 and are stored in a memory 307. Memory 307 may be a random access memory or a combination of a random access memory and a read only memory. Each object includes an object identifier (OID) 310A–310C to uniquely identify the object. Object identifiers and their data structures will be described in more detail below.

Mobile station 302 is configured to request and download additional objects or a new dynamic agent operating program over the air. In particular, mobile station 302 includes a modulator 312 and a transmitter circuit 314 connected between controller 304 and an antenna 316 for transmitting data. Mobile station 302 also includes a receiver circuit 318 and demodulator 320 connected between antenna 316 and controller 304 for downloading data.

Data may be sent to mobile station 302 from a mobile management server 402. The operation of mobile management server 402 is managed by a controller 404 and operating program 406. Mobile management server 402 includes a modulator 408 and a transmitter circuit 410 connected between controller 404 and an antenna 412 for transmitting data. Mobile management server 402 also includes a receiver circuit 414 and demodulator 416 connected between antenna 412 and controller 404 for downloading data. A repository of objects 418 is stored in a memory. The controller 404 can access the objects stored in repository 418.

Figure 4:
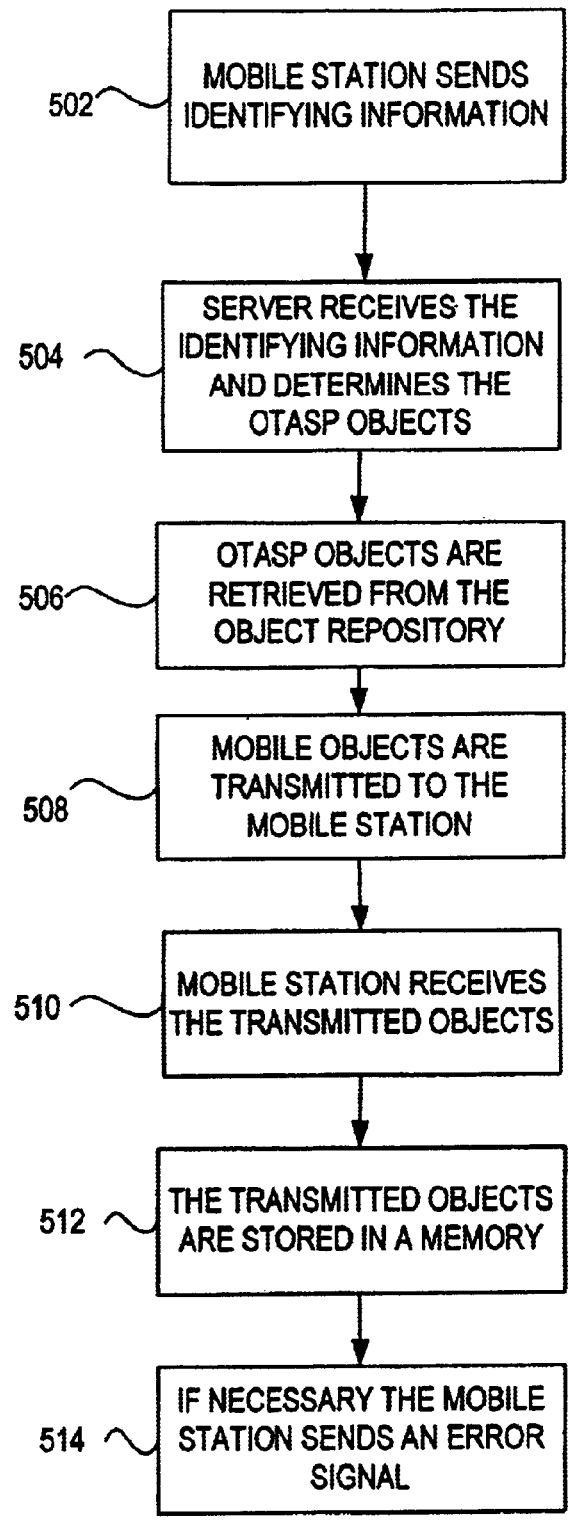
FIG. 4 shows a method for downloading objects to a mobile station in response to a request from the mobile station.

FIG. 4 illustrates a procedure used for downloading objects to mobile station 302 in response to a request from mobile station 302. A procedure for over the air service provisioning (OTASP) of a mobile station is shown for illustration purposes only and with the understanding that other mobile station initiated downloads are performed in a similar fashion. OTASP is performed when mobile station 302 first registers itself and must be performed before the user can use a mobile station. In step 502, dynamic agent operating program 202 in mobile station 302 sends mobile station identifying information, such as the model number, enterprise, bearer type and electronic serial number (ESN) to mobile management server 402. The information is modulated by modulator 312 and transmitted to antenna 316 by transmitter circuit 314. The transmission of data according to the present invention may be performed using secure data transmission techniques. Furthermore, protocols for sending data over the air are known to those skilled in the art.

In step 504, mobile management server 402 receives the mobile station identifying information and determines the OTASP objects to be used by the mobile station 302. The identifying information is received at receiver circuit 414 via antenna 412 and demodulated by demodulator 416. The demodulated information is used by operating program 404 to identify the corresponding object identifiers and access the OTASP objects from the repository of objects 418. For example, mobile management server 402 may determine that users of a particular model type and belonging to a particular enterprise require a particular e-mail service object.

Next, operating program 404 uses the object identifiers to retrieve the OTASP objects from object repository 418 in step 506. In step 508 the OTASP objects are transmitted to mobile station 302. Modulator 408, transmitter circuit 410 and antenna 412 are used to transmit the OTASP objects to mobile station 302.

The transmitted OTASP objects are received at antenna 316 and sent to controller 304 and dynamic agent operating program 202 via receiver circuit 318 and demodulator 320 in step 510. Instep 512, the OTASP objects are stored in memory 307.

Finally, in step 514 mobile station 302 transmits a signal indicating that the transmission was successful or that there was an error. When an error is indicated, mobile management server 402 may retransmit the requested objects. The requested object may then be accessed by dynamic agent operating program 202. Mobile station 302 may transmit another signal after the object has been accessed by the dynamic agent operating program 202 to indicate whether the object has functioned properly. Certain objects may be configured to be deleted after they have been executed. For example, an object designed to update dynamic agent operating program 202 would have no further use after the object is executed and may be deleted.

Users may automatically or manually query mobile management server 402 to determine if new services and corresponding objects are being provided. In particular, users may send identifying information and a list of object identifiers currently stored in mobile station 302 to mobile management server 402. Mobile management server 402 may then compare the transmitted list of object identifiers to the list of object identifiers stored in repository 418. Using the object identifiers in manner described below, mobile management server 402 then sends a list of available new services and corresponding object identifiers back to mobile station 302. The mobile management server 402 can also send such a list without a query from the user, because it already knows the list of successfully activated services in the mobile station 302 as it receives an acknowledgement for each successfully activated service. A list of new services and corresponding object identifiers are then stored in a memory of mobile station 302. The user may then review the list of new services and choose a service to be activated at the user's convenience. In certain circumstances, when downloading a new object, such as a new object that provides a new service, the user may also have to download a new dynamic agent operating program that includes a link to the new object. However, the user will never be required to download an entire new control program 200 to utilize a new service.

Memory 307 is only capable of storing a limited number of objects. Accordingly, in one embodiment of the invention, mobile station 302 may be configured to display a list of current objects stored in memory 307 and the amount of memory being used by each object. The user may select objects from the displayed list and indicate that they are to be deleted. For example, mobile station 302 may display a list that includes "E-mail program version 1.4—1 MB." The user may free up 1 MB of memory by deleting the E-mail program object.

A list of available new objects provided by mobile management server 402 may also include information about their memory size. The user may use this information along with the information pertaining to current objects to make download decisions. For example, the user may wish to download a new scheduling program object that has a size of 500 KB. If the user has less than 500 KB of free memory, the user will have to scroll through the list of current objects and determine which objects to delete to free up enough memory. Of course, some objects may be identified as essential and will never be deleted. In one embodiment, at least some of the essential objects are stored in a read only memory. Furthermore, certain objects may be identified to only allow the user to delete them after downloading another object. For example, a user may only be able to delete a volume control object only after a new volume control object has been downloaded and stored in memory 307.

Mobile management server 402 requested downloads are carried out in a similar manner. Mobile management server may first send data to mobile station 302 that indicates the object identifier of an object. Mobile station 302 may then query memory 307 to determine if the object is present. If the object is not present, mobile station 302 will transmit a corresponding message and the object will then be transmitted from mobile management server 402 to mobile station 302 in a manner similar to that shown in FIG. 4.

Mobile management server 402 requested downloads may facilitate the diagnosis and repair of malfunctions of mobile station 302. For example, mobile management server 402 may contain one or several objects for diagnosing malfunctions of specific mobile station models. Each diagnostic object may be downloaded and executed by mobile station 302. For example, a channel status check object may be downloaded and executed to perform a check on the available channels and a parameter query object may be downloaded and executed for querying parameters like configuration information, error counts etc., in a mobile station 302. The diagnostic objects may be configured to cause the transmission of the results of tests performed by the diagnostic object back to the mobile management server 402. Additional diagnostic objects may then be sent to further diagnose the problem. Furthermore, after the problem has been diagnosed, an object may be sent from mobile management server 402 to mobile station 302 to correct the problem. In the example given above, a new channel power level object may be sent to mobile station 302 to increase the power to a channel if the diagnostic object determined that the malfunction was the result of insufficient power to a channel.

The present invention is not limited to over the air transmission and downloading of standard objects. For example, a technician may monitor the results transmitted by mobile station 302 as the result of the execution of a diagnostic object and then create a new custom object to be downloaded and executed by mobile station 302. The custom object will be designed to further diagnose or repair the malfunction. The use of such a system increases the amount of maintenance that can be performed over the air and reduces the number of times consumers are required to go through the burdensome process of bringing their mobile stations to service centers.

Transmitting objects only as they are needed or requested by users allows for a relatively smaller memory 307 in mobile station 302. Certain objects, such as diagnostic objects, may be used infrequently and therefore may be downloaded only when needed and then deleted. Furthermore, users may download and store only the objects they need to use the services they desire instead of downloading an operating program that includes modules for all available services, including services they have no intention of using.

Object identifiers (OIDs) may have several different data structures. In one embodiment, they are in a convenient alphanumeric format of "Enterprise.Model.UniqueMSID-.SubOID." The "Enterprise" element identifies the company or group using the system. The "Model" element identifies the model type of mobile station. Furthermore, each individual mobile station is assigned a unique "UniqueMSID" identification. Each object is assigned a unique "SubOID" identification.

The above data structure makes it convenient to identify objects intended to be transmitted to several mobile stations. In an illustrative example, a data file 204D (shown in FIG. 2) containing the phone numbers of people belonging to an organization may be assigned a unique SubOID element and the organization may be assigned a unique Enterprise element. If the file containing phone numbers is to be downloaded by all of the mobile stations belonging to the Enterprise, the object may be identified by "Enterprise.Sub-OID." Furthermore, if a first object $SubOID_1$ is to be downloaded by a first group of mobile stations having a first model type $Model_1$ and belonging to an Enterprise, while a second object $SubOID_2$ is to be downloaded by a second group of mobile stations having a second model type $Model_2$ and belonging to the same Enterprise, the objects may be identified as "$Enterprise.Model_1.SubOID_1$" and "$Enterprise.Model_2.subOID_2$," respectively.

While the present invention has been described in connection with the illustrated embodiments, it will be appreciated and understood that modifications may be made without departing from the true spirit and scope of the invention.

What is claimed is:

1. A method of modifying control software installed on a mobile station, wherein the control software includes a dynamic agent operating program linked to a group of objects, the method comprising the steps of:

storing the dynamic agent operating program linked to the group of objects in a memory of the mobile station;

wirelessly transmitting a new object from a management server to the mobile station;

receiving the new object at the mobile station;

storing the new object in the memory of the mobile station;

wirelessly transmitting from the mobile station to the management server an update query including mobile station identifying information;

compiling a list of new objects that are stored in the management server and are not stored in the memory of the mobile station; and wirelessly transmitting from the mobile station to the management server a request for one of the new objects in the compiled list.

2. A method of modifying control software installed on a mobile station, wherein the control software includes a dynamic agent operating program linked to a group of objects, the method comprising the steps of:

storing the dynamic agent operating program linked to the group of objects in a memory of the mobile station;

wirelessly transmitting a new object from a management server to the mobile station;

receiving the new object at the mobile station;

storing the new object in the memory of the mobile station;

wirelessly transmitting from the mobile station to the management server an update query including mobile station identifying information;

compiling a list of new objects that are stored in the management server and are not stored in the memory of the mobile station; and wirelessly transmitting from the mobile station to the management server a request for one of the new objects in the compiled list;

displaying a list of objects currently stored in the memory of the mobile station; and allowing a user to select objects from the list of objects currently stored in the memory and delete the selected objects from the memory.

3. A method of modifying control software installed on a mobile station, wherein the control software includes a dynamic agent operating program linked to a group of objects, the method comprising the steps of:

storing the dynamic agent operating program linked to the group of objects in a memory of the mobile station;

wirelessly transmitting a new object from a management server to the mobile station;

receiving the new object at the mobile station;

storing the new object in the memory of the mobile station;

wirelessly transmitting from the mobile station to the management server an update query including mobile station identifying information;

compiling a list of new objects that are stored in the management server and are not stored in the memory of the mobile station;

wirelessly transmitting from the mobile station to the management server a request for one of the new objects in the compiled list; and displaying the list of new objects and the amount of memory required by each of the objects included in the list of new objects.

* * * * *